United States Patent
Macrae et al.

(10) Patent No.: US 8,607,876 B2
(45) Date of Patent: Dec. 17, 2013

(54) FLAPPER VALVE

(75) Inventors: Jonathan Macrae, Houston, TX (US);
Bulent Finci, Sugar Land, TX (US);
Jaime Pedraza, Cypress, TX (US);
Mark Schiel, Magnolia, TX (US);
Robert Crispin Porter, Cypress, TX (US)

(73) Assignee: ThruBit, B.V., Rijswijk (NL)

( * ) Notice: Subject to any disclaimer, the term of this patent is extended or adjusted under 35 U.S.C. 154(b) by 226 days.

(21) Appl. No.: 13/028,752

(22) Filed: Feb. 16, 2011

(65) Prior Publication Data

US 2012/0205116 A1  Aug. 16, 2012

(51) Int. Cl.
*E21B 34/08*  (2006.01)

(52) U.S. Cl.
USPC ...................................... 166/332.8

(58) Field of Classification Search
USPC .............................. 166/386, 332.8
See application file for complete search history.

(56) References Cited

U.S. PATENT DOCUMENTS

| | | | |
|---|---|---|---|
| 3,802,927 A * | 4/1974 | Gomada | 148/512 |
| 3,860,066 A * | 1/1975 | Pearce et al. | 166/72 |
| 4,291,722 A * | 9/1981 | Churchman | 137/496 |
| 4,457,376 A | 7/1984 | Carmody et al. | |
| 4,506,729 A | 3/1985 | Davis et al. | |
| 4,557,376 A * | 12/1985 | Probst et al. | 206/219 |
| 4,605,041 A | 8/1986 | Teumer | |
| 4,846,281 A | 7/1989 | Clary et al. | |
| 7,624,809 B2 | 12/2009 | Frazier et al. | |
| 7,703,532 B2 * | 4/2010 | O'Malley et al. | 166/332.8 |
| 2006/0124315 A1* | 6/2006 | Frazier et al. | 166/369 |
| 2007/0137869 A1* | 6/2007 | MacDougall et al. | 166/386 |

OTHER PUBLICATIONS

International Search Report and Written Opinion for PCT/US2012/024806, dated Sep. 19, 2012.

* cited by examiner

*Primary Examiner* — William P Neuder
(74) *Attorney, Agent, or Firm* — Chamberlain Hrdlicka

(57) ABSTRACT

A flapper valve includes a valve body, a valve cover pivotally coupled to the valve body at a hinge between an open and closed position, and a biasing element biasing the valve cover to the closed position. The valve cover includes an interior face comprising a sealing surface and a boss including a face surrounded by a beveled edge joining the boss with the sealing surface.

16 Claims, 3 Drawing Sheets

FLAPPER VALVE

BACKGROUND

In hydrocarbon drilling operations, a flapper valve may be installed in a tubular substructure above the drill bit. The flapper valve controls back pressure during drilling operations by permitting fluid (e.g., mud) flow in one direction while preventing fluid flow in the other direction. The flapper valve consists of a disc-shaped valve cover that is housed in a valve body. The valve cover is hinged to the valve body with a force applied to bias the valve cover to the closed position. During normal drilling operations, fluid flow causes the valve cover to open; however, when flow stops or is reversed, the spring force biases the valve cover closed.

Wireline logging employs one or more logging tools that are suspended on a cable and run through the drilling tubulars, including the flapper valve. The spring force applied to the flapper valve cover causes the face or the edge of the valve cover to contact the logging tools as they pass through the valve. As a result of this contact, the valve cover may catch in a tool upset when retrieving the tool back through the valve and effectively wedge the tool against the valve body, resulting in the tool getting stuck downhole. This can cause delay and additional costs from retrieving and repairing the stuck logging tool.

SUMMARY OF DISCLOSED EMBODIMENTS

In one embodiment, a flapper valve includes a valve body, a valve cover pivotally coupled to the valve body at a hinge between an open and closed position, and a biasing element biasing the valve cover to the closed position. The valve cover includes an interior face comprising a sealing surface and a boss including a face surrounded by a beveled edge joining the boss with the sealing surface.

In another embodiment, a flapper valve includes a valve body, a valve cover pivotally coupled to the valve body at a hinge between an open and closed position, and a biasing element biasing the valve cover to the closed position. The valve cover includes a lip opposite the hinge and the lip comprises a rounded edge.

In yet another embodiment, a drill string includes a drill bit and a flapper valve positioned in the drill string above the drill bit. The flapper valve includes a valve body, a valve cover pivotally coupled to the valve body at a hinge between an open and closed position, and a biasing element biasing the valve cover to the closed position. The valve cover includes an interior face comprising a sealing surface and a boss comprising a face surrounded by a beveled edge joining the boss with the sealing surface. The valve cover further includes a lip opposite the hinge and the lip comprises a rounded edge.

BRIEF DESCRIPTION OF THE DRAWINGS

For a more detailed description of the embodiments, reference will now be made to the following accompanying drawings.

DETAILED DESCRIPTION OF THE DISCLOSED EMBODIMENTS

Figure 1:
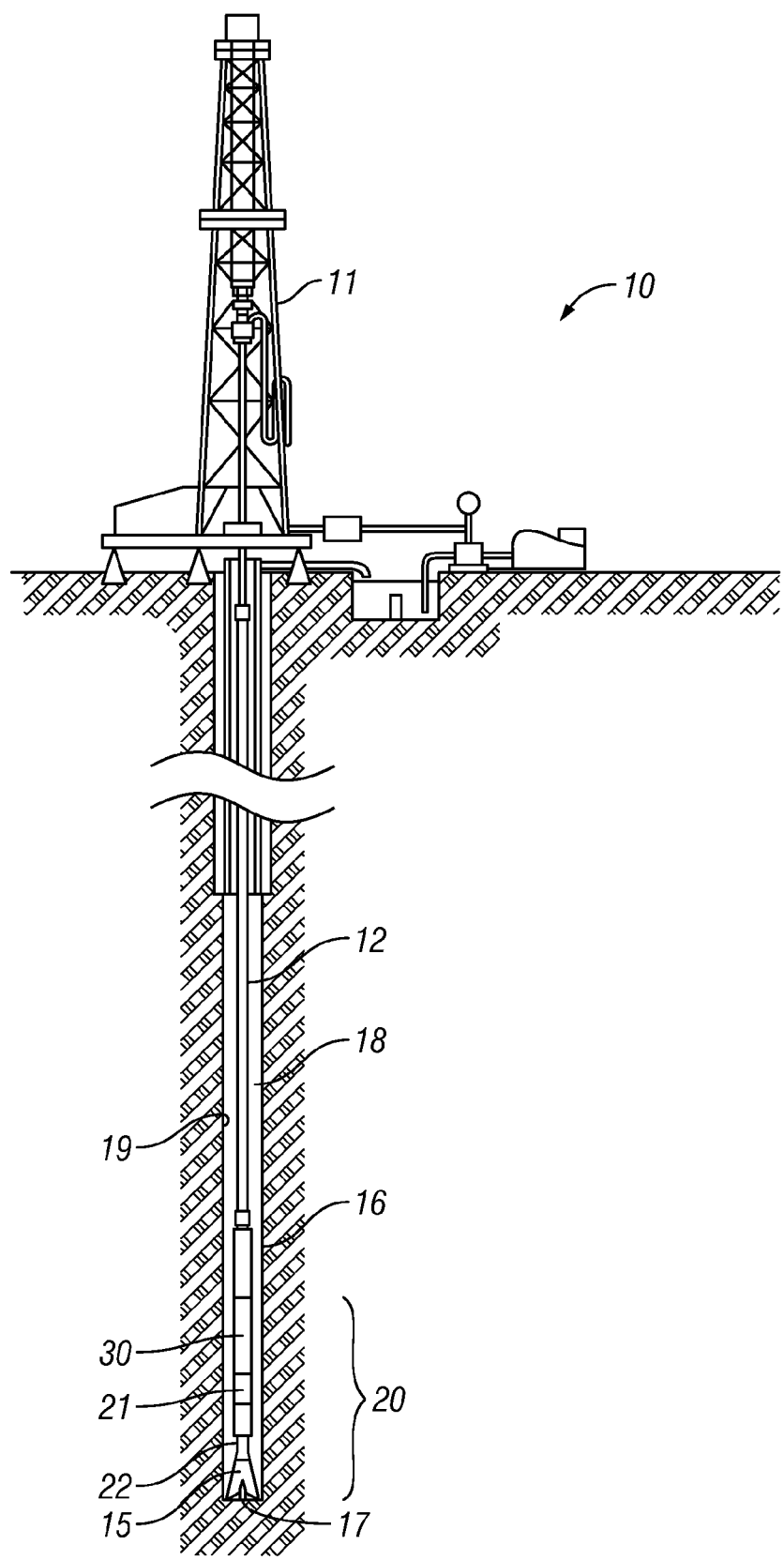
FIG. 1 shows a schematic view of an embodiment of a drilling system in accordance with various embodiments.

In the drawings and description that follows, like parts are marked throughout the specification and drawings with the same reference numerals. The drawing figures are not necessarily to scale. Certain features of the invention may be shown exaggerated in scale or in somewhat schematic form and some details of conventional elements may not be shown in the interest of clarity and conciseness. The invention is subject to embodiments of different forms. Some specific embodiments are described in detail and are shown in the drawings, with the understanding that the disclosure is to be considered an exemplification of the principles of the invention, and is not intended to limit the invention to the illustrated and described embodiments. The different teachings of the embodiments discussed below may be employed separately or in any suitable combination to produce desired results. The terms "connect," "engage," "couple," "attach," or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

Referring now to FIG. 1, an example downhole drilling system 10 comprises a rig 11, a drill string 12, a Bottom Hole Assembly (BHA) 20 including drill collars 30, stabilizers 21, flapper sub 22 and the drill bit 15. With force or weight applied to the drill bit 15 via the drill string 12, the rotating drill bit 15 engages the earthen formation and proceeds to form a borehole 16 along a predetermined path toward a target zone. The drilling fluid or mud pumped down the drill string 12 and through the flapper sub 22 passes out of the drill bit 15 through nozzles positioned in the bit face. The drilling fluid cools the bit 15 and flushes cuttings away from the face of bit 15. The drilling fluid and cuttings are forced from the bottom 17 of the borehole 16 to the surface through an annulus 18 formed between the drill string 12 and the borehole sidewall 19.

Figure 2A:
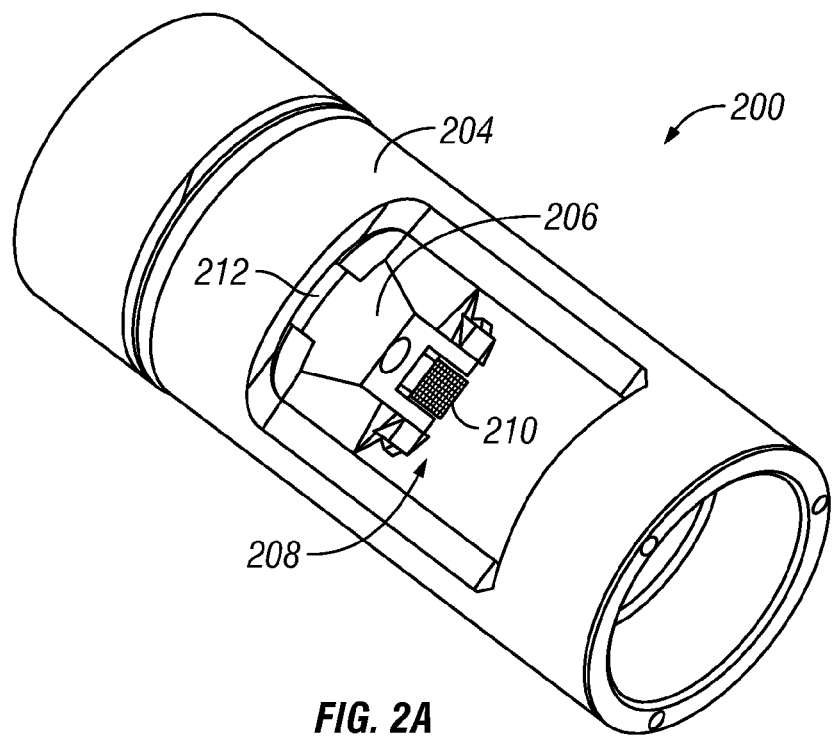
FIG. 2a shows a closed flapper valve in accordance with various embodiments.

FIG. 2a shows a flapper valve 200 in the closed position in accordance with various embodiments. A tubular member houses a flapper valve body 204 and is positioned above the bit 15 on the drill string 12. The flapper valve body 204 couples to a flapper valve cover 206 through rotational coupling 208. In some embodiments, the rotational coupling 208 comprises a hinge. A biasing element 210 applies a spring force to bias the flapper valve cover 206 to a closed position. In the closed position, the flapper valve 200 prevents fluid flow through the valve. The flapper valve cover 206 includes a lip 212 that rests against the valve body 204 when the flapper valve 200 is in the closed position.

Figure 2B:
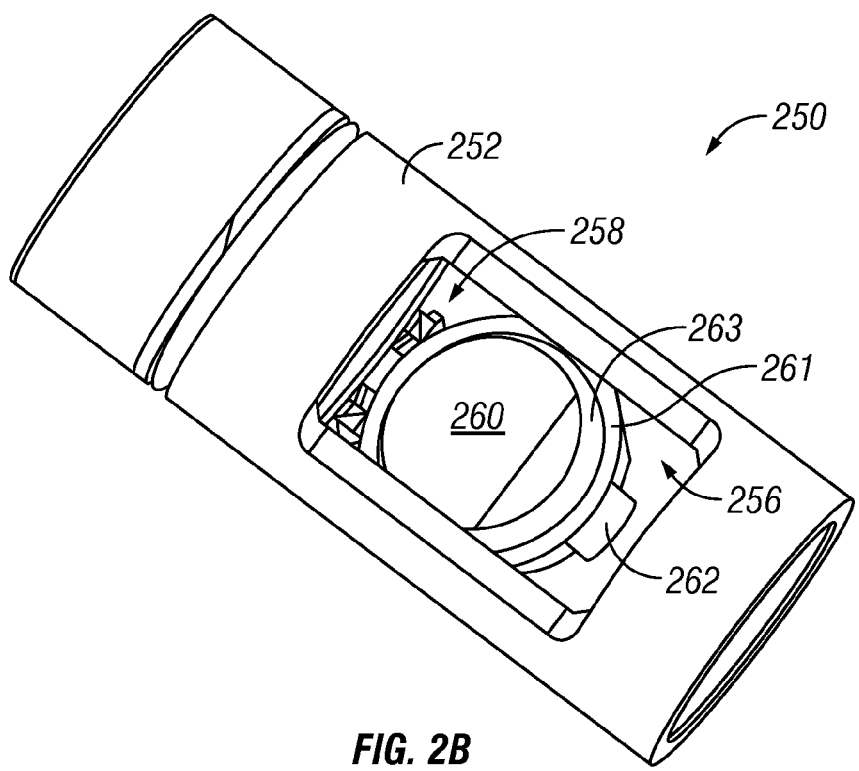
FIG. 2b shows an open flapper valve in accordance with various embodiments.

FIG. 2b shows a flapper valve 250 in the open position in accordance with various embodiments. Similarly to FIG. 2a, a tubular member houses a flapper valve body 252 and is positioned above the bit 15 on the drill string 12. The flapper valve body couples to a flapper valve cover 256 through rotational coupling 258. As above, the rotational coupling 258 may comprise a hinge with a biasing element (not shown) that applies a spring force to the flapper valve cover 256 to bias the flapper valve cover 256 to the closed position. During normal drilling operations, mud flow through the drill string 12 to the bit 15 keeps the flapper valve cover 256 open.

In accordance with various embodiments, the inner face of the valve cover 256 includes a boss 260 and a sealing surface 261. The sealing surface 261 seals against the valve body when the valve cover 256 is in the closed position and thus prevents fluid flow through the flapper valve 250. The boss 260 on the interior face of the valve cover 256 prevents logging tools from contacting a lip 262 of the valve cover 256 as the tools pass through the flapper valve 250. Preventing contact between logging tools and the lip 262 of the valve cover 256 greatly reduces the likelihood of a logging tool becoming wedged or stuck between the valve cover 256 and the valve body. In accordance with various embodiments, the boss 260 may be referred to as having a face and a beveled edge 263, where the beveled edge 263 joins the face of the boss 260 to the sealing surface 261.

Figure 3:
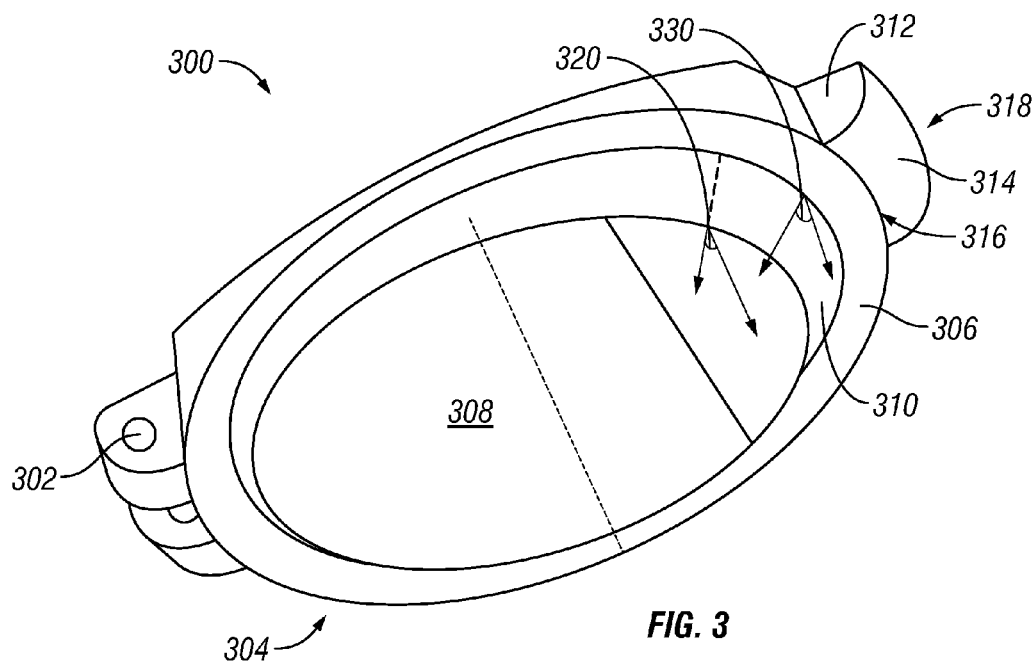
FIG. 3 shows a three-dimensional view of a flapper valve cover in accordance with various embodiments.

FIG. 3 shows a valve cover 300 in accordance with various embodiments. The valve cover 300 may couple to a valve body, for example valve body 204 shown in FIG. 2a, by a rotational coupling such as hinge 302. The valve cover 300 is biased to the closed position relative to the valve body by a biasing element (not shown) that applies a spring force to the valve cover 300. An inner face 304 of the valve cover 300 comprises a sealing surface 306 and a boss 308. As explained above, the sealing surface 306 prevents fluid flow through the flapper valve and the boss 308 prevents logging tools from contacting a lip 312 of the valve cover 300 as the tools pass through the flapper valve, reducing the likelihood of a logging tool becoming wedged or stuck between the valve cover 300 and the valve body.

In some embodiments, the lip 312 comprises a curved face 314. The curved face 314 further prevents tools from being stuck between the valve cover 300 and the valve body. For example, an increased diameter portion of a tool (an "upset") may become stuck on an edge of the valve cover 300 if the upset is sudden enough that the valve cover boss 308 and beveled edge 310 fail to provide sufficient clearance between the valve cover 300 and the valve body for the tool upset.

In an exemplary embodiment, a curvature of the curved face 314 transitions from substantially parallel to the sealing surface 306 in region 316 proximal to the sealing surface 306 to substantially perpendicular to the sealing surface 306 in region 318 distal to the sealing surface 306. The curved face 314 of the lip 312 provides an additional surface that may engage a tool upset as the tool is being retrieved to open the valve cover 300. In this case, the curved face 314 provides additional protection by forcing additional clearance between the valve cover 300 and the logging tool as the upset passes through the valve.

An angle 320 between the beveled edge 310 and a line normal to the face of the boss 308 is defined as shown in FIG. 3. An angle 330 between the beveled edge 310 and a line normal to the face of the sealing surface is similarly defined as shown in FIG. 3. In some embodiments, the angle 320 is in the range of 30 degrees to 60 degrees. Similarly, in some embodiments, the angle 330 is in the range of 30 degrees to 60 degrees.

Figure 4:
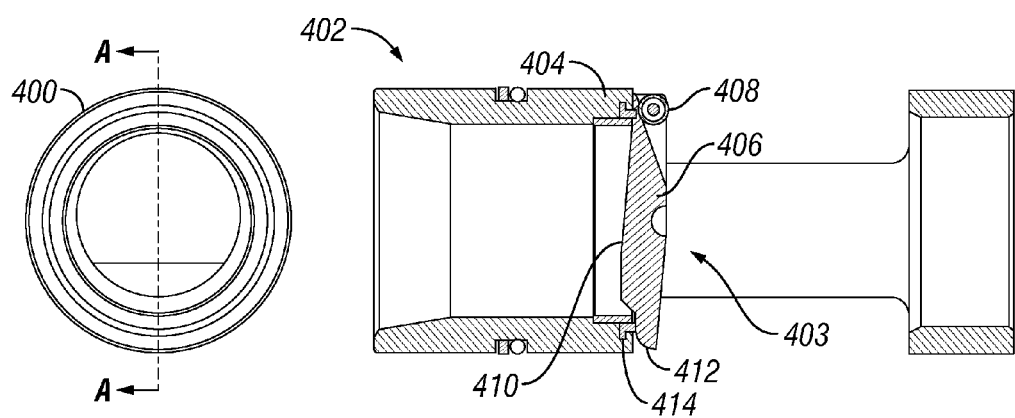
FIG. 4 shows a side view of a flapper valve in accordance with various embodiments.

Referring now to FIG. 4, a cross-section 402 of tubular 400 is shown in accordance with various embodiments. A flapper valve assembly 403 comprises a valve cover 406 coupled to a valve body 404, for example by a rotational coupling 408 (e.g., a hinge). The rotational coupling 408 may comprise a biasing element (not shown) that applies a spring force to bias the valve cover 406 to a closed position. In the closed position, the valve cover 406 prevents fluid flow through the flapper valve assembly 403.

In some embodiments, the valve cover 406 includes a curved lip 412 that rests against the valve body 404 when the valve cover 406 is in the closed position. The valve body 404 also includes a sealing surface 414 for sealing against the valve cover 406 when the valve cover 406 is in the closed position. The valve cover 406 may alternately or additionally include a boss 410. As discussed above, the curved lip 412 and the boss 410 prevent logging tools from contacting an edge of the valve cover 406 as the tools pass through the flapper valve assembly 403.

While specific embodiments have been shown and described, modifications can be made by one skilled in the art without departing from the spirit or teaching of this invention. The embodiments as described are exemplary only and are not limiting. Many variations and modifications are possible and are within the scope of the invention. For example, although the above figures show a valve cover that comprises a boss and a curved lip, various embodiments may include a valve cover that comprises either a boss or a curved lip. Accordingly, the scope of protection is not limited to the embodiments described, but is only limited by the claims that follow, the scope of which shall include all equivalents of the subject matter of the claims.

What is claimed is:

1. A flapper valve, comprising:
   a valve body;
   a valve cover pivotally coupled to the valve body at a hinge between an open and closed position;
   a biasing element biasing the valve cover to the closed position; and
   the valve cover further comprising:
      an interior face comprising:
         a sealing surface; and
         a boss comprising a face surrounded by a beveled edge joining the boss with the sealing surface; and
      a lip extending radially outward from the sealing face opposite the hinge.

2. The flapper valve of claim 1 wherein an angle between the beveled edge and a line normal to the sealing surface is substantially between 30 degrees and 60 degrees.

3. The flapper valve of claim 1 wherein an angle between the beveled edge and a line normal to the face of the boss is substantially between 30 degrees and 60 degrees.

4. The flapper valve of claim 1 wherein an angle between the face of the boss and the sealing surface is substantially between 0 degrees and 10 degrees.

5. The flapper valve of claim 4 wherein the face of the boss is substantially parallel to the sealing surface.

6. The flapper valve of claim 1 wherein the lip comprises a rounded edge.

7. The flapper valve of claim 6 wherein a surface of the lip's rounded edge curves from substantially parallel to the sealing surface to substantially perpendicular to the sealing surface.

8. A flapper valve, comprising:
   a valve body comprising a sealing surface;
   a valve cover pivotally coupled to the valve body at a hinge between an open and closed position against the sealing surface;
   a biasing element biasing the valve cover to the closed position;
   the valve cover further comprising a lip opposite the hinge, the lip comprising a rounded edge on a side facing the sealing surface.

9. The flapper valve of claim 8 wherein a surface of the lip's rounded edge curves from substantially parallel to a sealing surface of the valve cover to substantially perpendicular to the sealing surface.

10. The flapper valve of claim 8 wherein the valve cover comprises an interior face comprising a sealing surface and a boss comprising a face surrounded by a beveled edge joining the boss with the sealing surface.

11. The flapper valve of claim 10 wherein an angle between the beveled edge and a line normal to the sealing surface is substantially between 30 degrees and 60 degrees.

12. The flapper valve of claim 10 wherein an angle between the beveled edge and a line normal to the face of the boss is substantially between 30 degrees and 60 degrees.

13. The flapper valve of claim 10 wherein an angle between the face of the boss and the sealing surface is substantially between 0 degrees and 10 degrees.

14. The flapper valve of claim 13 the face of the boss is substantially parallel to the sealing surface.

15. A drill string, comprising:
 a drill bit; and
 a flapper valve positioned in the drill string above the drill bit, the flapper valve comprising:
  a valve body;
  a valve cover pivotally coupled to the valve body at a hinge between an open and closed position;
  a biasing element biasing the valve cover to the closed position;
  the valve cover further comprising an interior face comprising:
   a sealing surface; and
   a boss comprising a face surrounded by a beveled edge joining the boss with the sealing surface; and
  the valve cover further comprising a lip extending radially outward from the sealing face opposite the hinge, the lip comprising a rounded edge.

16. The drill string of claim 15 wherein a surface of the lip's rounded edge curves from substantially parallel to the sealing surface to substantially perpendicular to the sealing surface.

* * * * *